United States Patent
Blackadder et al.

(10) Patent No.: US 12,463,924 B1
(45) Date of Patent: Nov. 4, 2025

(54) METHOD AND SYSTEM OF GENERATING TRAINING DATA FOR IDENTIFYING MESSAGES RELATED TO MEETINGS

(71) Applicant: Microsoft Technology Licensing, LLC, Redmond, WA (US)

(72) Inventors: Ian Gordon Blackadder, London (GB); Royi Ronen, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/652,411

(22) Filed: May 1, 2024

(51) Int. Cl.
*H04L 51/046* (2022.01)
*G06F 40/166* (2020.01)
*G06F 40/279* (2020.01)
*G06F 40/40* (2020.01)
*G06N 3/0455* (2023.01)

(52) U.S. Cl.
CPC .......... *H04L 51/046* (2013.01); *G06F 40/166* (2020.01); *G06F 40/279* (2020.01); *G06F 40/40* (2020.01); *G06N 3/0455* (2023.01)

(58) Field of Classification Search
CPC ... H04L 51/046; G06F 40/166; G06F 40/279; G06F 40/40; G06N 3/0455
See application file for complete search history.

(56) References Cited

U.S. PATENT DOCUMENTS

| | | | |
|---|---|---|---|
| 2019/0005024 A1 | 1/2019 | Somech et al. | |
| 2023/0297765 A1 | 9/2023 | Vendrow | |
| 2023/0394226 A1 | 12/2023 | Medalion | |
| 2024/0022618 A1 | 1/2024 | Gambhir | |
| 2024/0205037 A1* | 6/2024 | Callegari | H04L 12/1831 |
| 2024/0314093 A1* | 9/2024 | Mehta | H04L 51/063 |

FOREIGN PATENT DOCUMENTS

CN 116975252 A 10/2023

OTHER PUBLICATIONS

Bernhardsson, et al., "Annoy", Retrieved From: https://github.com/spotify/annoy, 2023, 6 Pages.
Rennard, et al., "Abstractive meeting summarization: A survey.", Transactions of the Association for Computational Linguistics vol. 11, Apr. 25, 2023, 23 Pages.

* cited by examiner

*Primary Examiner* — Benjamin M Thieu
(74) *Attorney, Agent, or Firm* — NovoTechIP International PLLC

(57) ABSTRACT

A system and method for training a machine-learning (ML) model to identify chat messages that are relevant to a meeting includes receiving a set of chat messages and additional data related to the meeting and constructing a prompt for transmission to a generative artificial intelligence (AI) tool, the prompt including some of the chat messages in the set and at least some of the additional data. The prompt is transmitted to the generative AI tool and a summary of the chat messages is received, where the summary identifies a subset of the chat messages. The identified subset is provided for display to a user and feedback data related to the identified subset is collected and used to label at least some of the identified subset of chat messages. A training dataset is then generated using the labeled chat messages. The training dataset is used to train the ML model to identify chat messages relevant to the meeting. The process of generating the training dataset and training the model is iterated with larger sets of chat messages until the trained ML model meets a threshold of accuracy.

20 Claims, 11 Drawing Sheets

{"Index": 14, "Type" : "Chat", "Subject" : "Simple relevancy model for chat messages",
"From" : {"Name" : "Anna"}, "DateTimeSent" : "February 14th",
"Snippet" : "Hey"}, {"Index": 15, "Type" : "Chat", "Subject" : "Simple relevancy model for chat messages",
"From" : {"Name" : "Anna"}, "DateTimeSent" : "February 14th",
"Snippet" : "I tried the relevancy model but it raises an error"}, {"Index": 16, "Type" : "Chat", "Subject" : "Simple relevancy model for chat messages",
"From" : {"Name" : "Anna"}, "DateTimeSent" : "February 14th",
"Snippet" : "What's for lunch"}, {"Index": 17, "Type" : "Chat", "Subject" : "Simple relevancy model for chat messages",
"From" : {"Name" : "Bob"}, "DateTimeSent" : "February 14th",
"Snippet" : "I have a new model I can send"}

FIG. 4A

```
{"Index": 14,
"Type" : "Chat",
"Subject" : "Simple relevancy model for chat messages",
"Messages" : [
    {"SubIndex" : 14.1,
    "From" : {"Name" : "Anna"},
    "DateTimeSent" : "February 14th",
    "Snippet" : "Hey"},
    {"SubIndex" : 14.2,
    "From" : {"Name" : "Anna"},
    "DateTimeSent" : "February 14th",
    "Snippet" : "I tried the relevancy model but it raises an error"},
    {"SubIndex" : 14.1,
    "From" : {"Name" : "Anna"},
    "DateTimeSent" : "February 14th",
    "Snippet" : "What's for lunch"},
    {"SubIndex" : 14.1,
    "From" : {"Name" : "Bob"},
    "DateTimeSent" : "February 14th",
    "Snippet" : "I have a new model I can send"}
]
}
```

FIG. 4B

METHOD AND SYSTEM OF GENERATING TRAINING DATA FOR IDENTIFYING MESSAGES RELATED TO MEETINGS

BACKGROUND

In today's fast-paced environment where users frequently communicate with many different individuals via different communication mechanisms such emails, text messaging, instant messaging, comments in documents and the like, locating messages that are relevant to a particular event or meeting can be a time consuming and challenging task. As a result, a user that plans to prepare for a meeting may have to spend a significant amount of time and effort searching through different applications and/or documents to locate items of information that are relevant to and/or helpful in preparing for the meeting. This can leave the user feeling overwhelmed and/or frustrated by the experience. This is exacerbated when the user has multiple meetings in a given time period and/or is given little time to prepare for a meeting, which is a common occurrence in today's fast-paced digital world.

Hence, there is a need for improved systems and methods of identifying messages related to meetings.

SUMMARY

In one general aspect, the instant disclosure presents a data processing system for training a machine-learning (ML) model to identify chat messages related to a meeting, the data processing system having a processor and a memory in communication with the processor wherein the memory stores executable instructions that, when executed by the processor alone or in combination with other elements, cause the data processing system to perform multiple functions. The function may include accessing a plurality of chat messages between one or more users, retrieving additional data related to the meeting, and constructing a prompt, via a prompt construction engine, for transmission to a generative artificial intelligence (AI) tool, the prompt including one or more of the plurality of chat messages and at least some of the additional data. The prompt is transmitted to the generative AI tool and a summary of the one or more of the plurality of chat messages is received from the generative AI tool, the summary citing a subset of the one or more of the plurality of chat messages. The cited subset of the one or more of the plurality of chat messages is provided for display to a user and user feedback data related to the cited subset of the one or more of the plurality of chat messages is collected. The cited subset of the one or more of the plurality of chat messages is labeled using the user feedback data and a training dataset is generated using the labeled subset of the one or more of the plurality of chat messages. The training dataset is used to train the ML model to identify chat messages related to a meeting. The process of generating the training dataset and training the ML model is iterated with larger sets of chat messages until the trained ML model meets a threshold of accuracy.

In yet another general aspect, the instant disclosure presents a method for training an ML model to identify chat messages that are relevant to a meeting. In some implementations, the method includes receiving a set of chat messages between one or more users, receiving additional data related to the meeting and constructing a prompt, via a prompt construction engine, for transmission to a generative artificial intelligence (AI) tool, the prompt including one or more chat messages in the set of chat messages and at least some of the additional data. The prompt is transmitted to the generative AI tool and a summary of the one or more chat messages in the set of chat messages is received from the generative AI tool, the summary identifying a subset of the one or more chat messages in the set of chat messages. The identified subset of the one or more chat messages is provided for display to a user and user feedback data related to the identified subset of the one or more chat messages is collected. The identified subset of the one or more chat messages is labeled using the user feedback data and a training dataset is generated using the labeled at least some of the identified subset of the one or more chat messages. The training dataset is used to train the ML model to identify chat messages relevant to the meeting. The process of generating the training dataset and training the ML model with larger sets of chat messages is iterated until the trained ML model meets a threshold of accuracy.

In a further general aspect, the instant application describes a non-transitory computer readable medium on which are stored instructions that when executed cause a programmable device to perform functions of receiving a request to assist a user to prepare for a meeting, retrieving a plurality of chat messages and retrieving additional data related to the meeting. The plurality of chat messages and the additional data are transmitted to a trained message identifying ML model, the trained message identifying ML model being a model that is trained to identify chat messages that are relevant to a given meeting. A subset of the plurality of chat messages is received as an output from the trained message identifying ML model. Then a a prompt is constructed, via a prompt construction engine, for transmission to a generative artificial intelligence (AI) tool, the prompt including one or more of the subset of the plurality of chat messages and at least some of the additional data. The prompt is transmitted to the generative AI tool and a summary of the one or more of the plurality of chat messages is received from the generative AI tool, the summary citing one or more of the subset of the plurality of chat messages. The summary and the cited one or more of the subset of the plurality of chat messages are provided for display to a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4A illustrates an example where a group of chat messages are provided without identifying the relationship between the messages.

FIG. 4B illustrates an example where the chat messages are grouped based by the message thread to which they belong.

DETAILED DESCRIPTION

Figure 1:
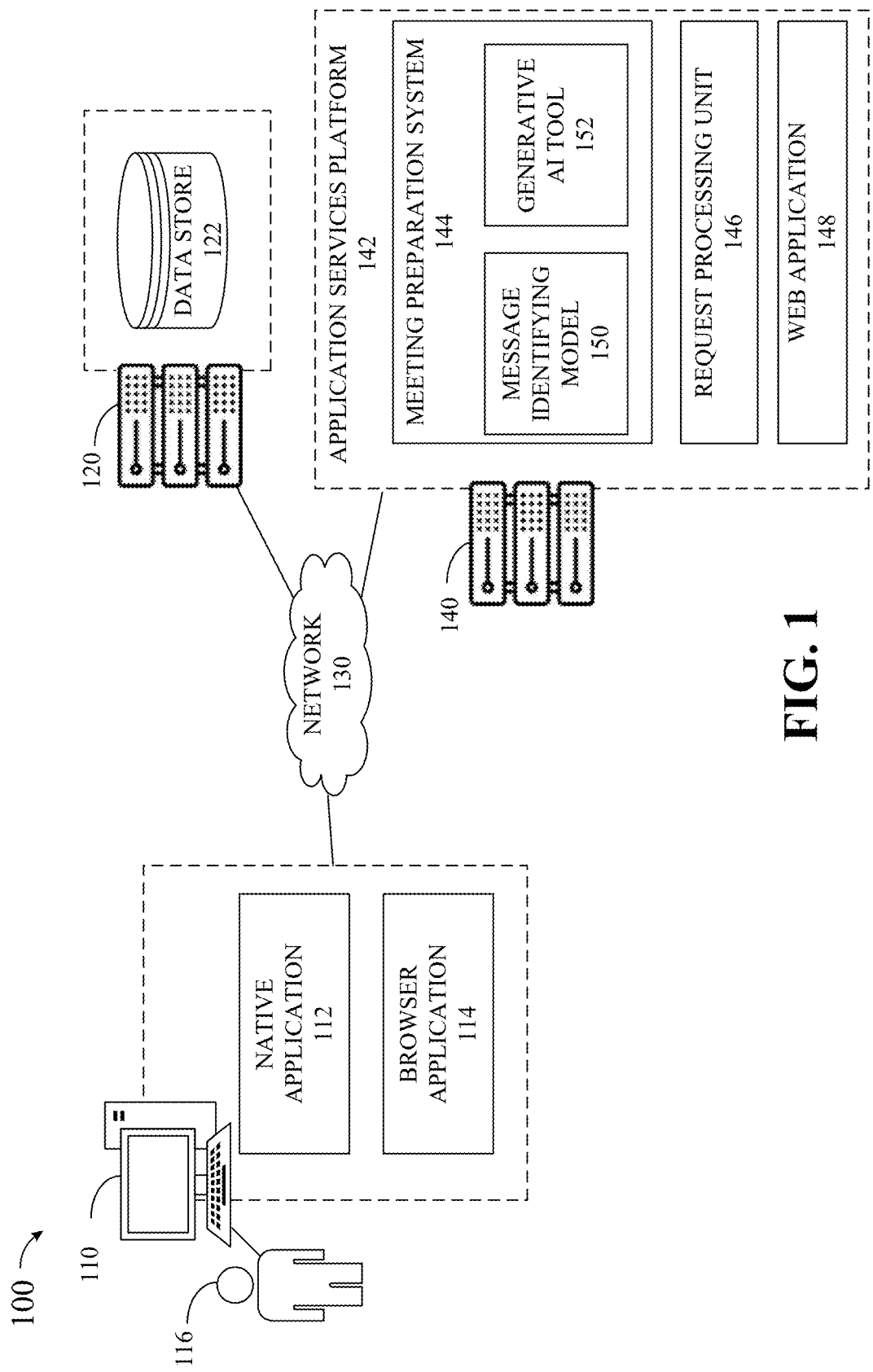
FIG. 1 depicts an example system upon which aspects of this disclosure may be implemented.

Virtual meetings are widely used by many different users in numerous scenarios and organizations for various purposes such as conducting business and communicating with others. With the ease of today's virtual meeting applications, users in many organizations attend multiple meetings in a day or a week. While many of these meetings may be virtual, some could be conducted in person. Another feature of today's fast-paced environment is the large number of messages users exchange with others on a number of different platforms. This is particularly true for instant messages, which are used often by many users in different organizations to conduct business. Instant messages (e.g., chat messages) are often short and more conversational than an email, which results in large numbers of instant messages being exchanged in short periods of time. While this provides flexibility and ease of communication, it makes locating relevant message a time consuming and challenging endeavor. As a result, when a user desires to prepare for one of their many meetings, the user may have to sift through hundreds or thousands of messages to locate messages that are relevant to the specific meeting. To address this, some applications offer the use of generative artificial intelligence (AI) to determine relevancy of messages. However, currently available generative AI models have restrictions on the size of the prompt that can be provided to the model. As a result, given the large number of chat messages users exchange in short periods of time, generative AI models are not well equipped for accurately identifying relevant messages from among a large corpus of messages. Furthermore, currently available AI models such as available generative AI models are not trained for identifying chat messages that are relevant to a given meeting. As a result, there exists a technical problem of lack of adequate mechanisms for efficiently and accurately identifying chat messages that are relevant to a given meeting to enable a user to prepare for the meeting. Furthermore, training a relevancy model that can identify relevant chat messages is difficult because training such a model would require labeled training data. However, labeling training data for chat messages is an expensive, time consuming and complex process. This process is made more complex since such training data would need to preserve user privacy. Thus, there also exists a lack of adequate mechanisms for efficiently and accurately training a model for identifying chat messages that relate to a meeting.

To address these technical problems and more, in an example, this description provides technical solutions that involves use of a multi-step process for training a model for identifying relevant chat messages and applying the trained model to identify and summarize the identified relevant chat messages and/or other materials for assisting a user to prepare for or during a meeting or to follow up on a meeting. The meeting preparation could be for a particular topic. The technical solutions include sending a set of chat messages in a prompt to a generative AI tool and receiving a synthesized summary of the messages with citation to a subset of messages. User validations of the subset of cited messages are received and the validated messages are given positive label and used to train the chat message identification model. In some implementations, the training process is iterative and repeated until the model passes a threshold of accuracy. The trained model is then used to identify chat messages associated with meetings related to the topic. The identified chat messages are then included in a prompt to a generative AI tool to create a summary for a user attending an upcoming meeting about the topic. In this manner, the technical solution provides the technical advantage of efficiently and accurately identifying chat messages that are relevant to an upcoming meeting. The technical benefits also include improvement to current AI models by efficiently training a model for identifying chat messages that are relevant to a given meeting.

As will be understood by persons of skill in the art upon reading this disclosure, benefits and advantages provided by such implementations can include, but are not limited to, a technical solution to the technical problems of lack of mechanisms for efficiently and accurately identifying relevant chat message and/or efficiently preparing for a meeting. The technical solutions enable use of a generative AI tool to generate a training data set which is then used to train a machine-learning (ML) model for identifying relevant chat messages. This not only reduces or eliminates the need for a user to search through hundreds of chat message to prepare for a meeting, but it also reduces the amount of computing and human resources needed to train a model for identifying relevant chat messages. The technical effects include at least (1) improving the efficiency and accuracy of preparing for a meeting; (2) improving the efficiency and accuracy of identifying chat message that are relevant to a meeting; and (3) increasing the efficiency of training a model for identifying relevant chat messages.

As used herein, the terms "application," and "software application" or "platform" may refer to any software program that provides options for performing various tasks or functionalities. The term "chat message" or "instant message" as used herein refers to a message communicated via an application that offers users the ability to exchange short messages. While chat messages can be long, they are commonly shorter and more casual than email messages.

FIG. 1 illustrates an example system 100, upon which aspects of this disclosure may be implemented. The system 100 includes a client device 110, a data storage server 120 and a server 140 hosting an application services platform 142. While shown as one server, the servers 120 and 140 may represent a plurality of servers that provide data storage and/or various other services. The client device 110 may be a type of personal, business or handheld computing device having or being connected to input/output elements that enable a user to interact with various applications (e.g., native application 112 or browser application 114). The client device 110 may be utilized by a user 116 to communicate with other users (e.g., exchange message and/or conduct a meeting) and/or to prepare for a meeting via one or more applications such as the application 112 or 114. Examples of suitable client devices 110 include but are not limited to personal computers, desktop computers, laptop computers, mobile telephones, smart phones, tablets, phablets, smart watches, wearable computers, gaming devices/computers, televisions; and the like. The internal hardware structure of a client device is discussed in greater detail with respect to FIGS. 6 and 7.

The client device 110 includes a native 112 and a browser application 114. The applications 112 and 114 are representative of one or more software programs executed on the client device that configure the device to be responsive to user input to allow a user to communicate with other users, conduct a virtual meeting and/or prepare for a meeting. Examples of suitable applications include, but are not limited to a virtual meeting application, instant messaging application, text messaging application, collaboration application, a copilot application and the like. The native application 114 is a web-enabled native application, in some implementations, that provides an interface for conducting a virtual meeting and/or for preparing for a meeting. The browser application 114 can be used for accessing and viewing web-based content provided by the application services platform 142. In such implementations, the application services platform 110 implements one or more web applications, such as the web application 148, that enables users to communicate with other users, conduct a virtual meeting and/or prepare for a meeting. The application services platform 110 supports both the native application 112 and the web application 148, and the users may choose which approach best suits their needs.

The client device 110 is connected to the server 120 via a network 130. The network 130 may be a wired or wireless network(s) or a combination of wired and wireless networks that connect one or more elements of the system 100. In some implementations, the network 130 includes one or more local area networks (LAN), wide area networks (WAN) (e.g., the Internet), public networks, private networks, virtual networks, mesh networks, peer-to-peer networks, and/or other interconnected data paths across which multiple devices may communicate. In some examples, the network 130 is coupled to or includes portions of a telecommunications network for sending data in a variety of different communication protocols. In some implementations, the network 130 includes Bluetooth® communication networks or a cellular communications network for sending and receiving data including via short messaging service (SMS), multimedia messaging service (MMS), hypertext transfer protocol (HTTP), direct data connection, WAP, email, and the like.

The server 120 is connected to or includes the data store 122 which functions as a repository in which databases relating to chat message, email message, documents, training data and/or other data that may be relevant to meetings are stored. As such, the data store 122 may function as a cloud storage site for communication and/or meeting data. Although shown as a single data store, the data store 122 may be representative of multiple storage devices and data stores which are accessible by the client device 110 and/or application services platform 142. For example, the data store 122 may include a data store for storing chat messages and a different data store for storing training datasets for training one or more models used by the system 100.

The application services platform 110 includes a request processing unit 146, meeting preparation system 144 and the web application 148. The request processing unit 150 is configured to receive requests from an application implemented by the native application 112 of the client device 110 and/or the web application 148 of the application services platform 110 and transmit the request to an appropriate element of the application services platform such as the meeting preparation system 144.

The meeting preparation system 144 includes a message identifying model 150 and a generative AI tool 152. Other implementations may include additional models and/or a different combination of models to provide services to the various components of the application services platform 110. The message identifying model is a model that is trained to receive a number of chat messages and to identify based on various parameters such as the topic of an upcoming meeting (e.g., subject of the meeting) and/or the meeting participants which chat messages are relevant to the meeting. This model is trained using the output from the generative AI model as discussed in greater detail with respect to FIG. 2.

The generative AI tool 152 is a machine learning model trained to generate textual content in response to natural language prompts. In some implementations, the generative AI tool 152 is implemented using a large language model (LLM). Examples of such models include but are not limited to a Generative Pre-trained Transformer 3 (GPT-3), or GPT-4 model. Other implementations may utilize other models or other generative models to generate textual content in response to prompts. The generative AI tool 152 is used by the application services platform 142 to generate a training dataset for training the message identifying model 150. Additionally, once the message identifying model 150 is trained, the generative AI tool 152 is used to format, summarize and/or otherwise organize chats messages that are identified as being relevant to a meeting by the generative AI tool 152. The textual output from the generative AI tool 152 can be presented to the requesting user via the native application 112 and/or the browser application 114 to enable the user to prepare for a meeting.

Figure 2A:
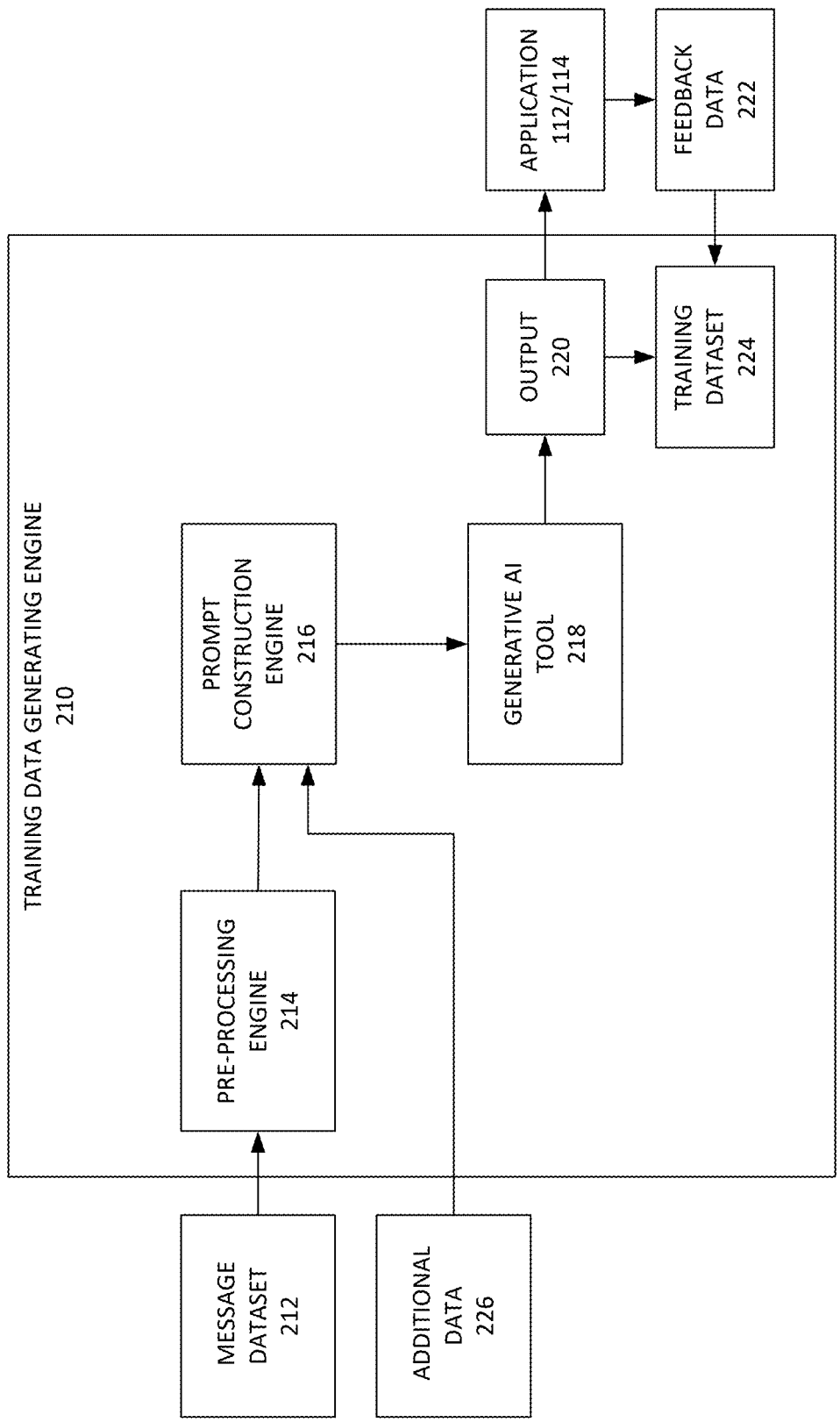
FIGS. 2A-2B depict examples of generating training data for training the message identifying model to identify chat messages that are relevant to a given meeting.

FIG. 2A depicts an example of generating training data for training the message identifying model to identify chat messages that are relevant to a given meeting. To begin the training process, a message dataset 212 is first created or collected. Initially, the dataset 210 may be a small dataset of chat messages that are most likely to be relevant to a given meeting. In an example, the initial dataset 210 consist of chat message that are exchanged in a chat interface of the meeting and as such are directly linked to the meeting. For example, when the virtual meeting application provides a chat feature, chat messages that are exchanged during, before or after a given a meeting, in the chat pane of the meeting, are collected to form the message dataset. These messages, along with additional data 226 are transmitted to the training data generating engine 210. In some implementations, along with the messages, metadata about the messages is transmitted to the training data generating engine 210. The metadata may include, identifying information (e.g., names, email addresses, user IDs, etc.) of the sender and/or the receiver of each message, the time/date at which the message was sent and/or read, and the name of the thread in which the message was sent. In an example, an API is used to collect the messages and the API specifies which metadata to retrieve with the messages.

The additional data 226 may include contextual data about the meeting and/or about the user requesting assistance, such as the meeting title (e.g., subject of the meeting), meeting participants, content of the invitation message, job title of the requesting user, job title of the requesting user's manager, and/or documents and emails associated with the meeting (documents included as an attachment with the meeting invitation, emails mentioning the meeting, etc.).

In some implementations, the chat messages in the message dataset 212 are first transmitted to a pre-processing engine 214. The pre-processing engine 214 analyzes the metadata included with the chat messages and reformats the data, when needed, to ensure the formatting is consistent with the additional data transmitted to the generative AI tool. For example, the metadata identifying the name of the sender of a chat message may be referred to as 'From', but to be consistent with the format of email messages, the pre-processing engine 214 may transform this phrase to 'Sender' so that there is more consistency in the information that is later passed to the Generative AI tool 218.

The pre-processed chat messages are then transmitted to the prompt construction engine 216 for constructing a prompt that can be submitted to the generative AI tool 218. The prompt construction engine 216 receives the processed chat messages as well as the additional data 226 and utilizes the receives data to construct a prompt in a manner that is likely to result in an accurate output from the generative AI tool 218. In an example, the prompt construction engine 216 can access a pre-generated prompt datastore to obtain one or more prompt templates. The prompt templates may include a prompt template for generating a summary of content that relates to a meeting to help a user prepare for the meeting. The prompt templates may include prompts for identifying relevant chat messages from among the input chat messages, creating a summary of chat messages that are relevant to the meeting and including citations to the identified chat messages and/or documents. The prompt construction engine 216 may analyze the received chat messages, identify chat message threads in the prompt and generate instructions to the generative AI tool 218 to identify relevant messages, summarize them, and the like. The prompt construction engine 216 customizes and/or formats the prompt or prompt templates with information relating to the generative AI tool 218, such that the prompt is provided in a format that is acceptable by and is most likely to result in accurate results from the generative AI tool 218. In an example, this involves providing a context for how message relate to each other. This is because if the chat messages are provided in a prompt without a context that identifies which message is a reply to a previous message, the meaning behind the messages may be lost. FIG. 4A illustrates an example where a group of chat messages are provided without identifying the relationship between the messages. As depicted, even if the messages are indexed and a date/time is provided, without identifying how the messages are related to each other, it is difficult to glean the meaning behind the conversation. FIG. 4B illustrates an example where the chat messages are grouped based by the message thread to which they belong. Initially, there may not be a need for collating the messages by thread immediately before inputting the messages to the message identifying model as each message is initially going to be treated independently. However, once the message identifying model is trained to improve, indexing may be performed by the prompt construction engine 216 or an indexing system, so that the message identifying model is able to output not just the messages deemed relevant but also the messages that come immediately before and/or after so that the generative AI tool has some context.

The constructed prompt is then transmitted to the generative AI tool 218, which receives the prompt as an input and generates a synthesized summary of the relevant information, citing chat messages that are related to the summarized entities as an output 220. The generative AI tool 218 may be the same as the generative AI tool 152 of FIG. 1 or it may be a different AI tool. While the generative AI tool 218 is displayed as being part of the training data generating engine 210, the generative AI tool 218 may be an AI service that is outside the training data generating engine 210 with which the training data generating engine 210 communicates to generate training data. The output 220 is provided to the application 112 or 114 for being displayed to the user. In an example, the output 220 is displayed via a user interface element of the application 112 or 114.

In some implementations, data regarding user interaction with the output 220 is then collected in the form of feedback data 222. This may be done by displaying a user interface element such as a thumps up and/or thumps down button via which the user can indicate whether or not they found the identified chat messages helpful for their meeting preparation and/or meeting follow up. This provides validation of the training data. This feedback is linked with the cited chat messages identified in the output 220 to generate a set of positive label training data entities for the training dataset 224. While positive labels can be collected via user feedback, positive labels may also be assigned to messages cited by the generative AI tool without checking whether the user provided positive feedback for the message. That is because generative AI tools such as Large Language Models have some observed capacity to determine which messages are not relevant to a meeting (e.g., generic greetings or messages that are clearly off topic such as "What's for lunch" when the meeting topic is "Simple relevance model for chat messages"). As a result, a chat message that is cited by the generative AI tool is likely to be relevant to the meeting. As such, these messages may be used in the training dataset even if there is no user validation. In practice, there is a tradeoff between using user validation, because user feedback is only received in a small percentage of cases and thus a training dataset that uses user feedback will have less data. However, the quality of such a training dataset is likely higher.

In some implementations, negatively labeled training data is included in the training dataset 224 by using chat messages that were included in the prompt to the generative AI tool 218 but were not identified as being relevant by the generative AI tool 218. Additional or alternative negative labels are derived from negative sampling, which is a standard approach in which messages are sampled at random from all the messages available with an assumption that a randomly chosen message is unlikely to be relevant.

In an example, the text in the chat messages is converted to numerical features to generate a training dataset that can be used to train the message identifying model 150. This ensure privacy is preserved and the model is able to process the training data quickly and efficiently. By using chat messages that are directly linked to meetings (for a small number of meetings) to generate the output 220 (which is then used to generate a training data point for the training dataset), a small set of training data is generated to form the training dataset 224.

The generated training dataset 224 is then transmitted to a training mechanism to train the message identifying model 150. As mentioned before, the message identifying model 150 may initially be a relevancy model with zero states. Alternatively, the model may be a pre-trained relevancy model. In an example, the pre-trained relevancy model is an encoder or sentence transformer. One example of an encoder that may be used is a Universal Sentence Encoder. Another example is referred to as the Paraphrase-multilingual-MiniLM-L12-v2.

Figure 4C:
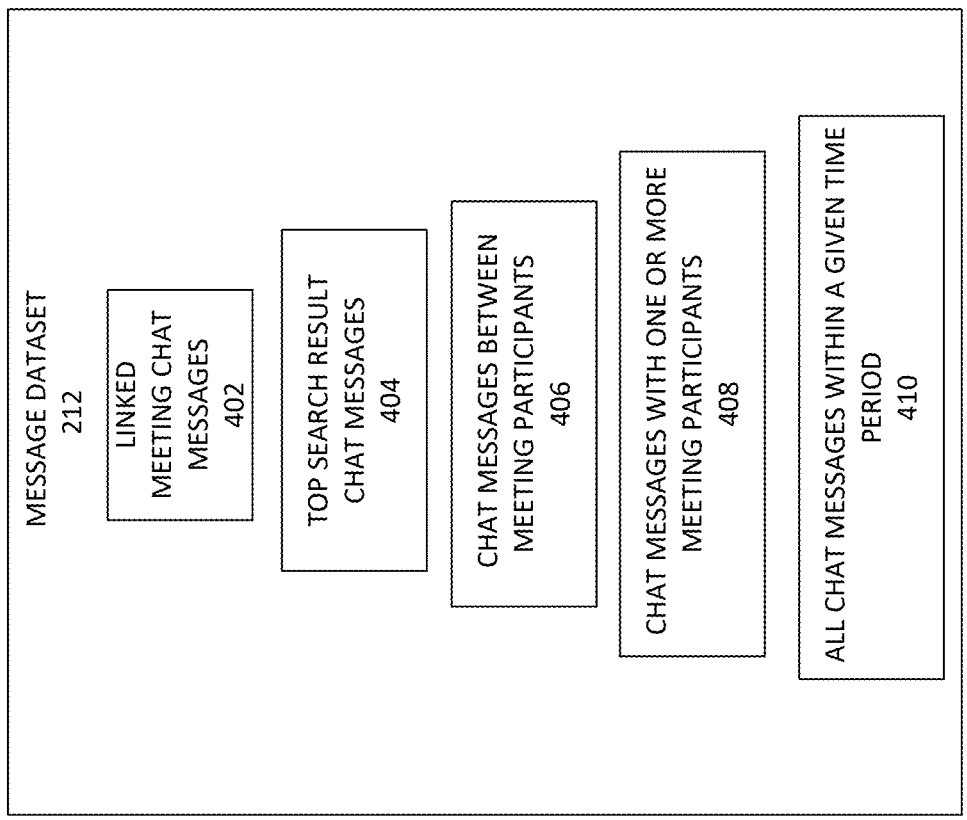
FIG. 4C depicts an example of the types of chat messages used to train the model at each iteration of the training process.

The training mechanism uses the generated training dataset to provide initial training for the model. Once the model is initially trained, it may be used, as discussed in more details with regards to FIG. 2B in a meeting preparation system to generate a larger training dataset. In some implementations, the model is iteratively trained with larger sets of data and then evaluated until a threshold of accuracy is reached. In some implementations, larger and larger sets of message datasets 212 are used until the desired accuracy is reached. FIG. 4C depicts an example of the types of chat messages used to train the model at each iteration of the training process. As depicted, the first iteration includes using linked meeting chat messages 402. These are chat messages that are directly linked to a meeting (e.g., chat messages from the chat pane of the meeting). If the chat messages that are directly linked to a meeting exceed a predetermined number of or include messages outside a given period of time, the messages may be limited to a specific number or recent messages (e.g., most recent 20 messages) and/or messages from a specific recent time period (e.g., messages from the last 2 weeks).

The next iteration involves using top search result chat messages 404. These are chat messages that are top search results when the user's chat messages are searched. This may involve conducting a search of chat message with a search query such as the meeting title and using the top ranked search results (e.g., top 30 messages or top 10% of search results, etc.). In some implementations, in addition to the top search results, a few messages that are chronologically before or after each top search result (e.g., 2 messages on either side of the search result) are also included in the top search result chat messages 404 to ensure context of the messages is not lost. In some implementations, the top search result chat messages 404 are then used as the message dataset 212 of FIG. 2A to generate an updated training dataset 224 which is then used to further train the message identifying model 150. In other implementations, after the initial training, the training data generating engine 210 is modified to include the trained message identifying model 150 such that the pre-processed data is transmitted to the trained message identifying model 150 first before being transmitted to the prompt construction engine 216. In this manner, the trained message identifying model 150 identifies some of the messages in the message dataset 212 as being relevant which are then included in the prompt to the generative AI tool 218 to increase accuracy and efficiency. The updated training dataset 224 which is generated as a result of the process is then used to update the trained message identifying model 150, before the next iteration.

Referring back to FIG. 4C, the next iteration of generating training dataset includes use of chat massage between meeting participants 406. This may include direct chat messages between the user and other meeting participants. Again, this may be used in the process depicted in FIG. 2B to update the training dataset 224 which is then used to further train the message identifying model 150. Once updating of the model 150 is done, if the threshold of accuracy is not reached, training continues with more messages until the threshold of accuracy is reached. In an example, as the performance of the model improves, more chat messages are provided to the model. For example, chat messages with one or more meeting participants 408 may be used before all chat message within a given time period 410 (e.g., all chat messages of the user) are used to further expand the message dataset 212. The chat messages with one or more meeting participants 408 may include group and meeting chat messages with one or more of the meeting participants in a given recent time period. All chat messages of the user within a given time period 410 may include all chat threads from a given time period. In some implementations, for the chat messages with one or more meeting participants 408 and all chat message within a given time period 410, a simple relevancy model may first be used to limit the number of chat messages included. In an example, a model that implements an approximate nearest neighbor (ANN) search approach is used to reduce the number of chat messages from the thousands to hundreds that are most likely to be relevant to the meeting or the requesting user. Then the smaller set of chat messages is transmitted to the training data generating engine 210 to generate a larger set of training data to update the training of the message identifying model 150. This enables use of a fast lookup mechanism to significantly reduce the number of messages submitted to the more accurate message identifying model 150, which in turn reduces the amount of processing and memory resources needed for processing the large number of chat messages.

In some implementations, for each iteration of the training dataset, the chat messages that are initially provided to the generative AI tool 218 (e.g., candidate chat messages), the ones that are cited by the generative AI tool 218 in its output, and the ones that receive positive user feedback once they are displayed to the user are logged in a database and/or used in the training dataset 224 to train the message identifying model 150 on relevancy of the chat messages. As discussed above, messages that are cited and/or receive positive feedback may receive a positive label, while messages that are not cited by the generative AI tool 218 may receive a negative label in the training dataset 224.

In some implementations, in the first iteration(s) of the training, the additional data 226 that is provided in the prompt to the generative AI tool 218 includes limited information such as only the meeting title and the meeting invitation content. This data is included in the training dataset 224 and is used to train the message identifying model 150. Once a larger set of labeled training data has been collected, additional features such as names of attached documents, user's job title, job titles' of other meeting participants, relationships between the meeting participants and the like is also provided as part of the additional data 226 and can be used in training of the message identifying model 150, which results in training layers on top of the initial embeddings and/or tuning the embeddings of the message identifying model 150. In some implementations, a linear regression is used over the many scores generated by measuring a similarity between features such as meeting title and message content or meeting organizer and message sender. Thus, the training mechanism may use the labeled training data to train the model via deep neural network(s) or other types of training. The initial training and/or updated trainings may be performed in an offline stage. Ongoing training may be achieved once the trained model is used in practice and more user feedback data is received.

In some implementations, once the message identifying model 150 has been trained or at each iteration of the training process, the performance of the model is evaluated via an evaluation engine (not shown). Evaluation is achieved by providing inputs to the trained message identifying model 150 and evaluating the outputs of the generative AI tool 218 one or more evaluation metrics such as precision, recall, F1-score, or user engagement parameters. Alternatively or additionally, the evaluation engine may implement an A/B testing mechanism to measure user satisfaction with the identified chat messages. This is achieved by including a mechanism for receiving user feedback in the user interface (UI) screen of the application (e.g., thumps up or thumps down button or text box for receiving textual feedback). Once an evaluation metric has been measured for the trained model, the measured evaluation metric is compared to a threshold value to determine if the measured evaluation metric meets a desired threshold of accuracy. The threshold value may be configurable and may depend on the level of accuracy desired for a given application.

Figure 3:
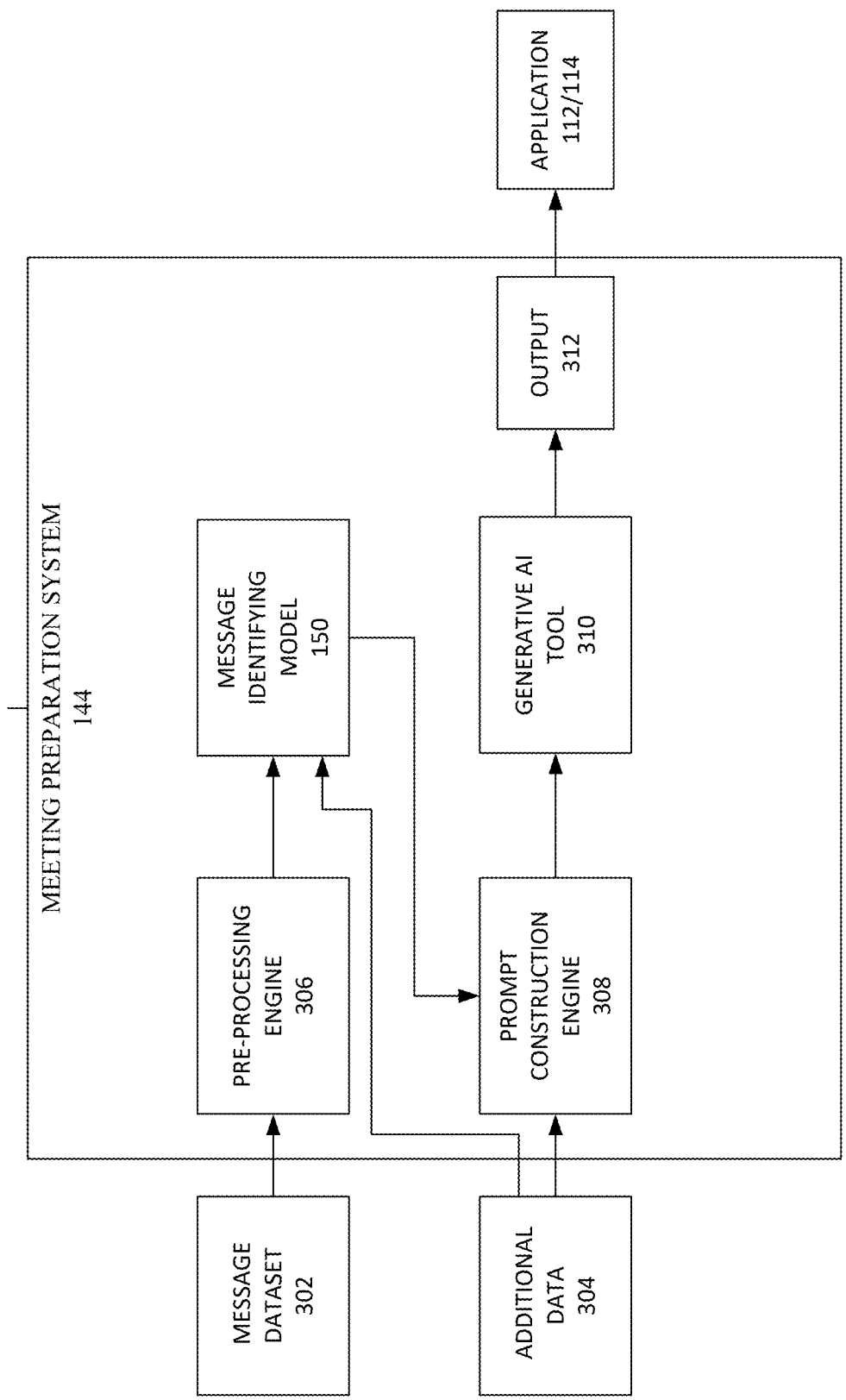
FIG. 3 depicts an example data flow between some elements of an example system that provides meeting preparation assistance.

FIG. 3 depicts an example data flow between some elements of an example system that provides meeting preparation assistance. In an example, the process is initiated when a user using an application that offers user assistance such as meeting preparation assistance (e.g., a copilot) submits a request for assistance in preparing for a meeting. The user request may be in natural language and may be submitted as a text into that is entered into a user input element such as an input box of a bot or copilot application. Alternatively, the user interface element may be a button on a meeting application (e.g., Teams) that a user can select to request preparation for a selected meeting (e.g., a meeting in the user's calendar). When the request is in a natural language format (e.g., "help me prepare for my meeting this afternoon titled "weekly team meeting"), the application may utilize a language model (e.g., a generative AI model) or a classifier to first determine which type of service the request should be transmitted to. In an example, this is achieved by transmitting the request to a request processing unit such as the request processing unit 146 of FIG. 1, which determines that the request should be transmitted to the meeting preparation system 144. Along with the request, metadata about the user and/or the meeting may be transmitted to the request processing unit and/or the meeting preparation system 144. Based on the metadata, the meeting preparation system may retrieve a message dataset 302 and additional data 304 for processing.

The message dataset 302 may include one or more of the categories of message displayed in FIG. 4C. In an example, the message dataset 302 includes linked meeting chat messages 402, top search result chat messages 404 and chat messages between meeting participants 406. In another example, instead of or in addition to the linked meeting chat messages 402, top search result chat messages 404 and chat messages between meeting participants 406, the message dataset 302 includes chat messages with one or more meeting participants 408 or all chat messages within a given time period 410. What number and which category of chat messages to use may depend on a variety of parameters such as the number or chat messages involved, the number of participants in the meeting, the level of accuracy of the trained model and the like. In an example, initially, when the model is not very well trained, the message dataset 302 only includes chat messages that are directly exchanged between two or more of the meeting participants and/or chat messages that are directly related to the meeting (e.g., chat messages exchanged in the chat pane of the meeting). Once the model has reached a threshold of accuracy, the messages are expanded to larger categories of messages such as top search result chat messages 404, chat messages with one or more meeting participants 408 or all chat messages within a given time period 410. When the meeting has a large number of meeting participants/or a large category of chat messages is being used, then one or more mechanisms may be used to reduce the number of chat messages. This may involve only using messages exchanges with a top number of participants (e.g., top 3, top 5 or top 10). Those participants being participants that are more likely to be relevant to the meeting and/or to the requesting user. Those participants may include the meeting organizer, the most important meeting in the meeting, and/or participants that are more closely related to the requesting user.

When the message dataset 302 includes a large number of chat messages, a mechanism may be employed to reduce the number of chat messages transmitted to the message identifying model 150 to increase efficiency. In an example, this involves use of an ANN algorithm to reduce the number of chat messages to a smaller set that is more likely to be relevant to the meeting and/or the requesting user. This may involve embedding a large number of chat messages and then utilizing an ANN algorithm to reduce the number of chat messages significantly to a smaller number that is more likely to be relevant to the meeting of interest. In another example, this involves using messages from specific chat threads such as group chats between the two or more of the meeting participants. This may involve use of heuristic that that the group chats include all or most of the other meeting participants. In yet another example, a meeting-to-meeting ranker may be used to rank the relationship of other meetings in relation to the meeting of interest and use chat messages from top ranked meetings.

In some implementations, when the message dataset 302 includes all chat messages within a given time period 410, a mechanism is used to first organize the chat messages by thread and retrieve information about each thread such as the name of the thread (if there is one), the people in the message thread, and/or the time the last message in the thread was sent. Then heuristics may be used to rank the threads for those threads that are most likely to contain relevant messages by comparing the meeting participants with the message thread participants and then taking into account other parameters that can identify relevant message threads. Messages from the top threads may then be used for processing, as discussed in more details below.

In some implementations, once a number of chat messages are selected for inclusion in the message dataset 302, a determination is made as to whether chat messages related to the selected messages should also be included. This may include identifying surrounding messages for the selected messages in order to ensure context is not lost. In an example, this involves including one or two messages (e.g., pairs, triplets of messages, etc.) that are exchanged between the same users before and/or after each selected message. In some implementations, chat messages are selected by first measuring the relevancy of individual messages (e.g., by using ANN) and selecting those messages having relevancy scores that meet a given threshold and then prepending the previous message(s) to the selected and appending the next message(s) to the selected message to create three groups of messages. Relevance of the three groups is then calculated and the group having the highest relevance is selected. This process may be repeated until prepending and appending fails to increase relevance, until a specific number of iterations has occurred or until some token or message allowance is met. In another implementation, a change in topic between messages is determined based on the amount of time elapsed between messages. This may be achieved by examining the relative times between nearest neighbor messages. The relative time is examined because depending on the type and volume of messages, sometimes even a short period of time may be indicative of a change in conversation (e.g., for a very high-volume communication channel, even a 10-minute gap in conversation may indicate a change in topic, while a different channel or different day may require hours between message to indicate a change of topic). Based on the relative time between the messages, the appropriate waiting time between messages that are linked for a given thread and time of day can be determined.

Once the number of messages are reduced to a reasonable number of messages or when the number of messages is a reasonable number to begin with, the messages in the message dataset 302 are transmitted to the pre-processing engine 306 for processing. The pre-processing engine 306 may operate in a similar manner as the pre-processing engine 214 of FIGS. 2A-2B to format the chat messages and/or the metadata transmitted by the chat messages. In some implementations, the pre-processing engine 306 also identifies and processes long chat messages (e.g., messages that are longer than 250 characters) to ensure both accuracy and efficiency of the message identifying model 150. Pre-processing long messages may include summarizing long messages and/or assessing the relevance of long messages and only including relevant sections of long messages. In some implementations, the pre-processing engine 306 pre-summarizes some of the messages (e.g., instead of transmitting 20 individual chat messages, the messages are summarized into one). To perform the required pre-processing steps, the pre-processing engine 306 may make use of one or more ML models such as a language mode. Once the chat messages are pre-processed, the pre-processed chat messages are transmitted to the message identifying model 150.

The pre-processed chat messages are then transmitted to the message identifying model 150 which analyzes the chat messages to identify messages that are likely to be relevant to the user and/or the meeting of interest. As discussed above, the message identifying model 150 is a trained relevancy model that calculates the relevancy of the input chat messages, based on parameters such as the additional data 304. The additional data 304 may include the subject of the meeting, the names of documents associated with the meeting, job title and/or relationships between meeting participants and the like. In some implementations, the model analyzes the input chat messages by embedding the chat messages and/or the input additional parameters, comparing the messages with the additional parameters, generating a relevancy score for each input chat message based on the comparison, and then ranking the chat messages based on the relevancy score. In alternative implementations, the model outputs the chat messages in a ranked order. In an example, the message identifying model 150 formats the output in a manner that is easy for use in a prompt for the generative AI tools 310. For example, the message identifying model 150 may output the top ranked chat messages in a format that can be directedly input into the prompt to the generative AI tool 218. In some implementations, the message identifying model 150 identifies the most relevant messages up to a given maximum number, and then those relevant messages are sorted not by relevance score but by time.

The output of the message identifying model 150 is provided to the prompt construction engine 308 for constructing a prompt that can be submitted to the generative AI tool 310. The prompt construction engine 308 may operate in a similar manner as the prompt construction engine 216 of FIG. 2A to receive the identified chat messages as well as the additional data 304 and utilize the receives data to construct a prompt in a manner that is likely to result in an accurate output from the generative AI tool 310. For example, the prompt construction unit 308 may access a pre-generated prompt datastore to obtain one or more prompt templates and use the prompt templates to construct a prompt for the generative AI tool 310. The prompt construction unit 202 may analyze the identified chat messages, identify chat message threads in the prompt, and identify related chat messages in the prompt to enable the generative AI tool 310 to determine the relationship between the identified chat messages. The prompt construction engine 308 customizes and/or formats the prompt or prompt templates with information relating to the generative AI tool 310 such that the prompt is provided in a format that is acceptable by and is most likely to result in accurate results from the generative AI tool 310.

The constructed prompt is then transmitted to the generative AI tool 310, which receives the prompt as an input and generates a synthesized summary of the relevant information, citing chat messages that are related to the summarized entities as an output 312. In some implementations, the cited chat messages are summarized by the generative AI tool 310 or are otherwise formatted to generate a succinct and useful content that the user can quickly review to prepare for the meeting. In an example, a post-processing engine (not shown) is used to format the summary and/or the chat messages in a desired manner before they are provided as an output. The formatting may relate to how the messages are cited. These formatting steps may be performed by a post-processing engine or by the generative AI tool 310 itself.

Figure 2B:
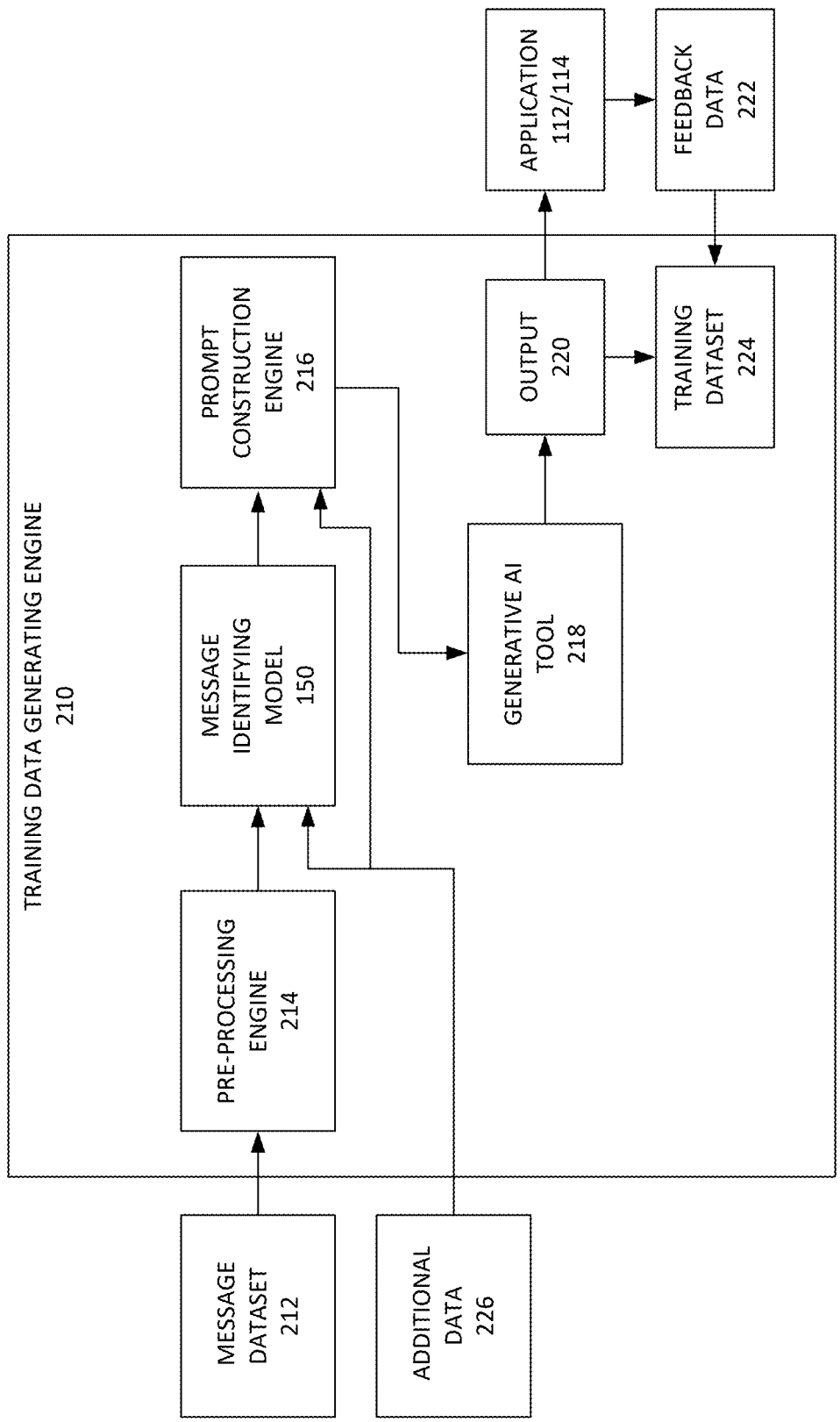

The generative AI tool 310 may be the same as the generative AI tool 218 of FIGS. 2A-2B or it may be a different AI tool. While the generative AI tool 310 is displayed as being part of the meeting preparation system 144, the generative AI tool 310 may be an external AI service with which the meeting preparation system 144 communicates to generate the required output. The output 312 is provided to the application 112 or 114 for being presented to the user. In an example, the output 312 is displayed via a user interface element of the application 112 or 114.

By using the message identifying model 150 which first assess relevancy of chat messages before they are passed to the generative AI tool, the system can improve the performance of the generative AI tool by not overwhelming it with irrelevant information from thousands of unrelated chat messages. Another technical benefit of this approach is reducing the cost of running the generative AI tool since the resource required to execute the tool are typically proportional to the length of the prompt. The technical solution improves user satisfaction by eliminating the need for users to use search functionality to find chat messages and then manually assessing which ones are relevant by examining each one. Moreover, the technical solution improves the process of providing assistance to a user for preparing for a meeting by offering an additional source of information for the generative AI tool to synthesize while keeping irrelevant information to a minimum. Furthermore, by not manually creating labels for the training data, user privacy is preserved. Still further, by not optimizing for a proxy metric but instead optimizing directly for the generative AI tool output that users have provided positive feedback for, the system more directly optimizes the data points that the users consider relevant.

Figure 5A:
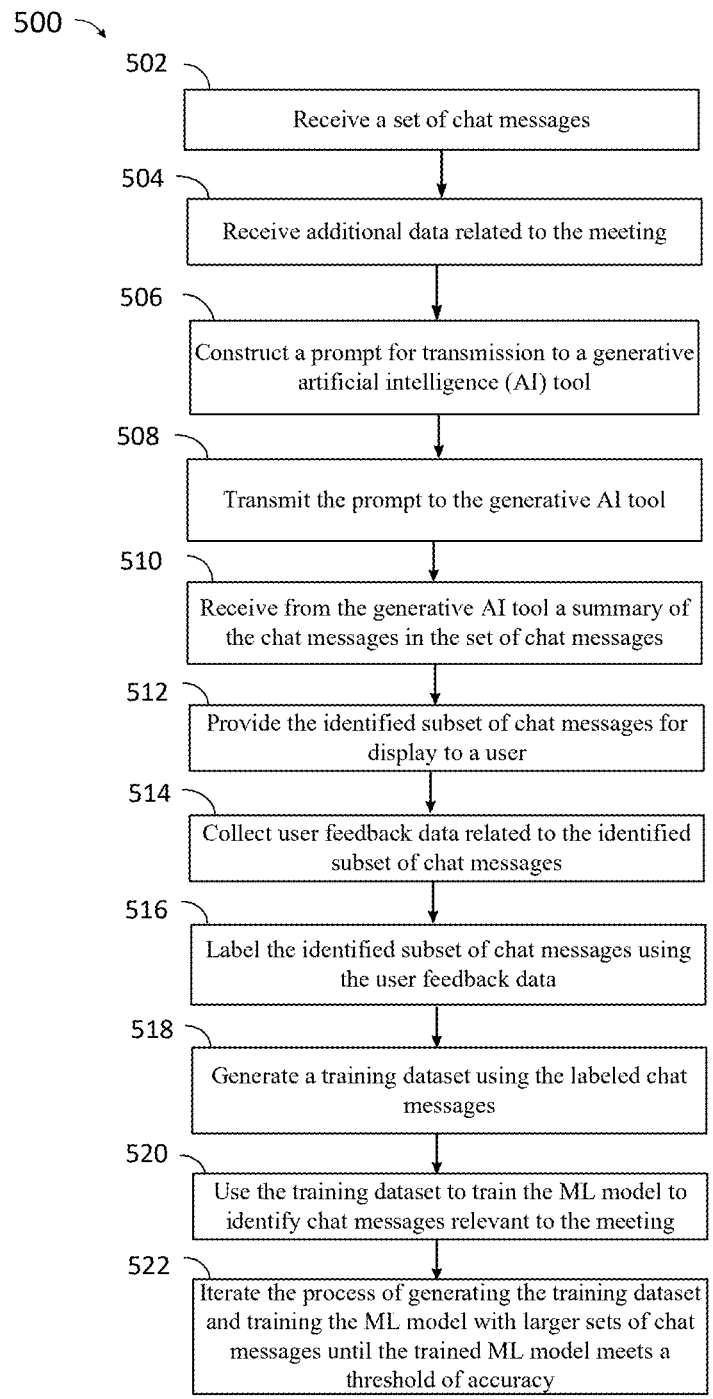
FIG. 5A is a flow diagram depicting an exemplary method for training a machine-learning model to identify chat messages that are relevant to a meeting.

FIG. 5A is a flow diagram depicting an exemplary method 500 for training a machine-learning model to identify chat messages that are relevant to a meeting. At least some of the steps of method 500 are performed by a training data generating engine such as the training data generating engine 210 of FIGS. 2A-2B. Method 500 begins and proceeds to receive a set of chat messages, at 502. The set of chat messages may initially include chat messages that are directly linked to a meeting of interest. As discussed above, the set of chat messages may be iteratively made larger by including other chat messages such as top search result chat messages, chat messages between two or more meeting participants, chat messages between one or more meeting participants and other users, and all chat messages exchanged within a given time period.

After receiving the set of chat messages, additional data related to the meeting is received, at 510. The additional data may include metadata and/or contextual data related to the meeting and/or related to a requesting user. In some implementations, the received set of chat messages undergo pre-processing to prepare the chat messages for submission to a generative AI tool. After receiving the chat messages and additional data and once any required pre-processing is complete, a prompt is constructed, via a prompt construction engine, for submission to a generative AI tool, at 506. The prompt includes at least some of the chat messages in the received set of chat messages. The constructed prompt is then transmitted to the generative AI tool, at 508.

In response, a summary of the chat messages that were included in the prompt is received from the generative AI tool, at 510. The summary includes identifying a subset of the chat messages that were included in the prompt. The subset includes chat messages that the generative AI tool identifies as being relevant to the meeting. The identified chat messages are then provided for display to a user, at 512. This may include transmitting the identified chat messages along with the summary received from the generative AI tool to an application which then displays the summary to the user.

After providing the identified chat message for display, method 500 collects user feedback data related to the identified chat messages, at 514. This may involve examining the user's interaction with the displayed data and collecting data when the user performs an action that indicates the user's approval of disapproval of the identified chat messages. As discussed above, this may include collecting feedback data when the user utilizes a user interface element such as a thumps up button to indicate approval of an identified chat message. Once the feedback data is collected, method 500 proceeds to label the identified chat messages using the user feedback data, at 516. In an example, when the user feedback indicates approval of the identified chat message, the identified chat message is given a positive label.

The labeled data is used to generate a training data set for training an ML model to identify relevant chat messages, at 518, before using the training dataset to train the ML model to identify chat messages relevant to the meeting, at 520. The process of generating the training dataset and training the ML model with larger sets of chat messages is iterated until the trained ML model meets a threshold of accuracy, at 522.

Figure 5B:
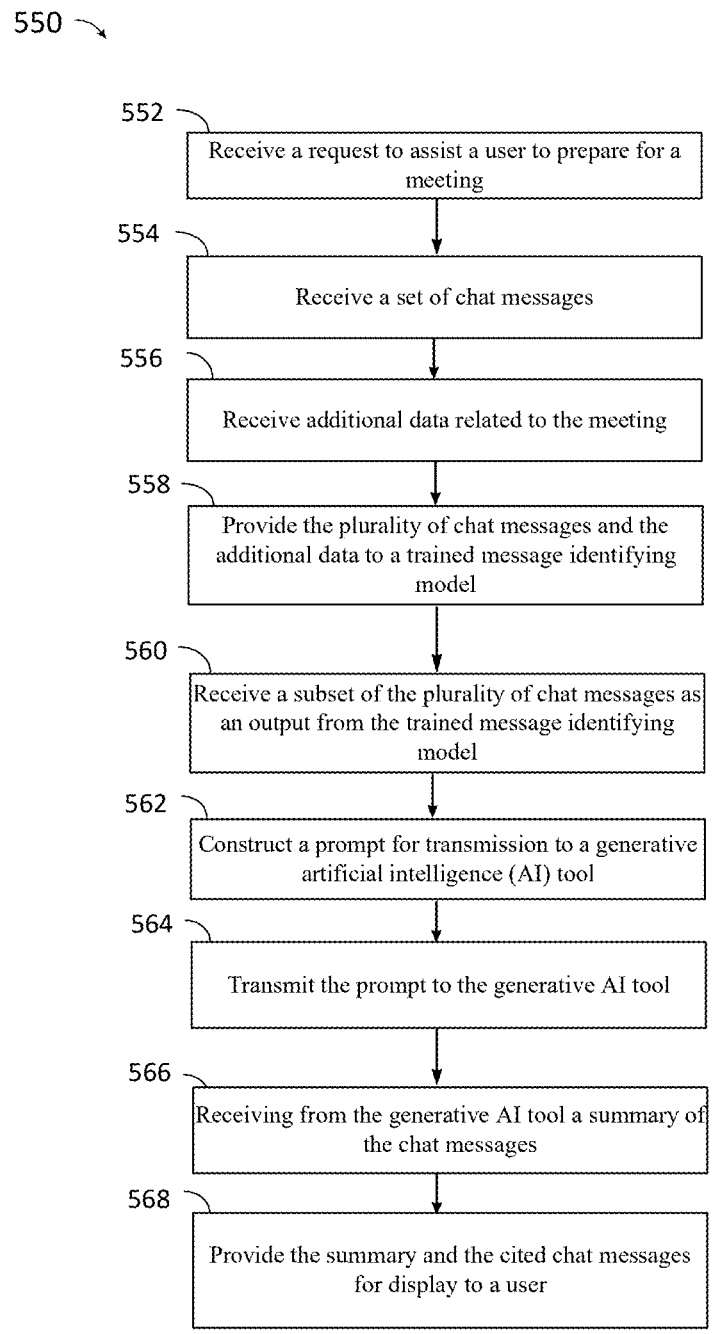
FIG. 5B is a flow diagram depicting an exemplary method for utilizing a trained message identifying ML model for identifying chat messages that are relevant to a meeting.

FIG. 5B is a flow diagram depicting an exemplary method 550 for utilizing a trained message identifying ML model for identifying chat messages that are relevant to a meeting. At least some of the steps of method 550 may be performed by a meeting preparation system 144 such as the meeting preparation system 144 of FIGS. 1, 2A-2B. Method 550 begins by receiving a request to assist a user to prepare for a meeting, at 552. The request may be received from an application services platform and/or directly from an application that enables a user to submit a request. After receiving the request, method 550 proceeds to receive a set of chat messages related to the meeting, at 554. The set of chat messages may initially include chat messages that are directly linked to the meeting and may be expanded later to include other chat messages such as top search result chat messages, chat messages between two or more meeting participants, chat messages between one or more meeting participants and other users, and all chat messages exchanged within a given time period.

After receiving the set of chat messages, additional data related to the meeting is received, at 556. The additional data may include metadata and/or contextual data related to the meeting and/or related to the requesting user. In some implementations, the received set of chat messages undergo pre-processing to prepare the chat messages for submission to the trained message identifying ML model. After receiving the chat messages and additional data and once any required pre-processing is complete, the plurality of chat messages and the additional data are provided to a trained message identifying ML model, at 558, the trained message identifying ML model being a model that is trained to identify chat messages that are relevant to a given meeting.

In response, a subset of the plurality of chat messages is received as an output from the trained message identifying ML model, at 560. After receiving the subset of the chat messages, a prompt is constructed, via a prompt construction engine, for submission to a generative AI tool, at 562, where the prompt includes the subset of the chat messages. The constructed prompt is then transmitted to the generative AI tool, at 564.

After transmitting the prompt, a summary of the subset of the chat messages that were included in the prompt is received from the generative AI tool, at 566. The identified chat messages are then provided for display to a user, at 568. This may include transmitting the identified chat messages along with the summary received from the generative AI tool to an application which then displays the summary to the user.

Figure 6:
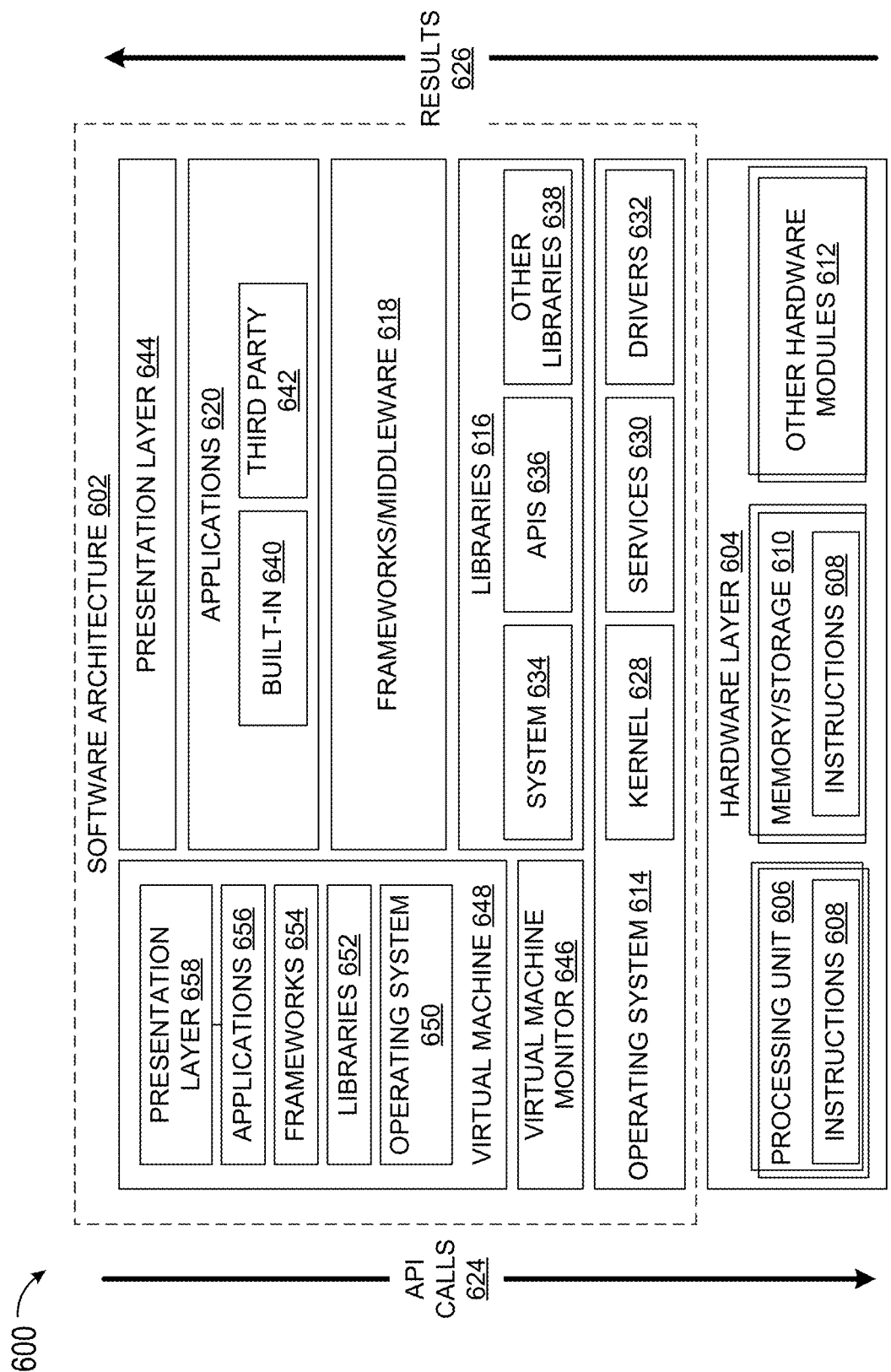
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application providers, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
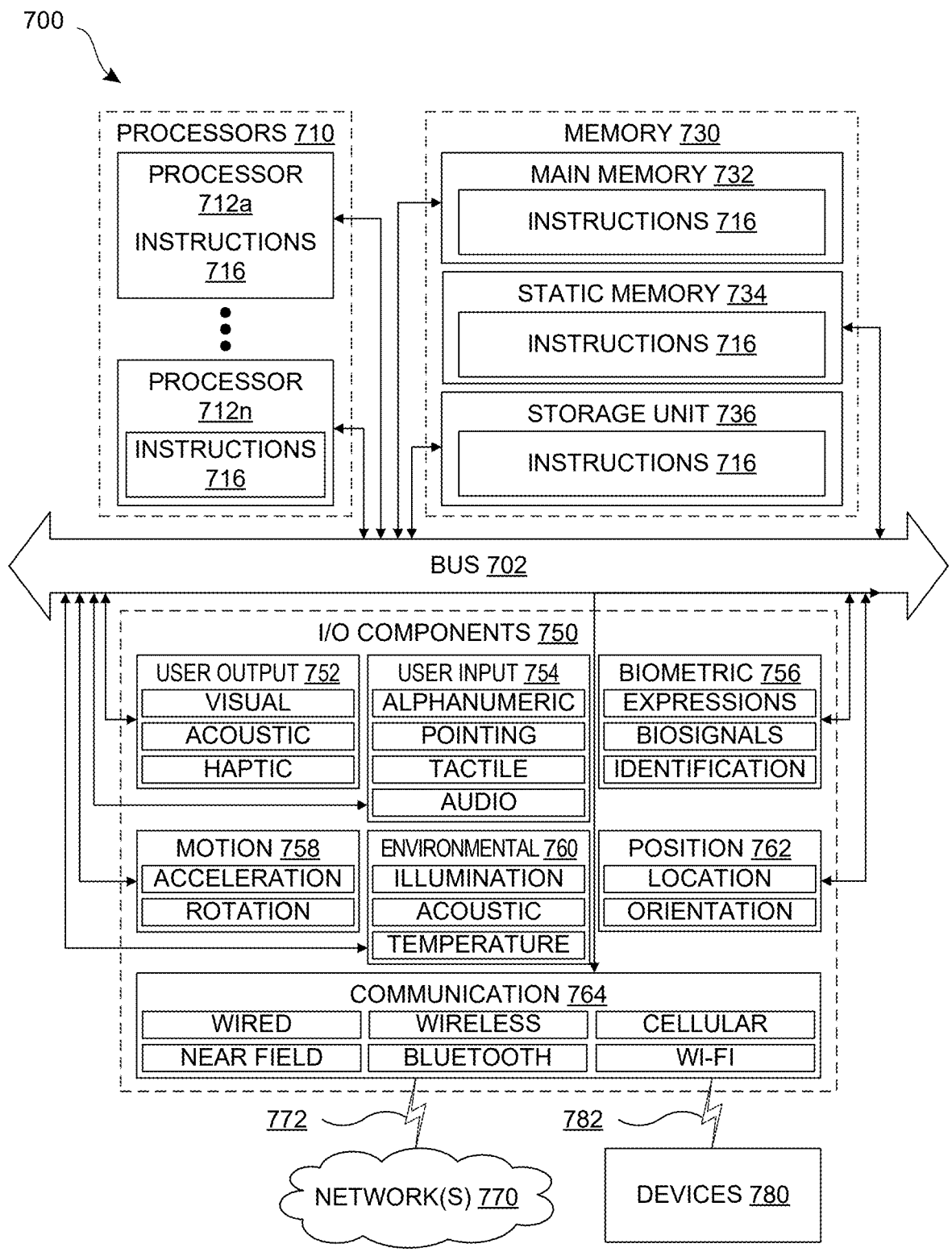
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764 such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

What is claimed is:

1. A data processing system for training a machine-learning (ML) model to identify chat messages related to a meeting, the data processing system comprising:
    a processor; and
    a memory in communication with the processor, the memory comprising executable instructions that, when executed by the processor alone or in combination with other processors, cause the data processing system to perform functions of:
        accessing a plurality of chat messages between one or more users;
        retrieving additional data related to the meeting;
        constructing a prompt, via a prompt construction engine, for transmission to a generative artificial intelligence (AI) tool, the prompt including one or more of the plurality of chat messages and at least some of the additional data;
        transmitting the prompt to the generative AI tool;
        receiving from the generative AI tool a summary of the one or more of the plurality of chat messages, the summary citing a subset of the one or more of the plurality of chat messages;
        providing the cited subset of the one or more of the plurality of chat messages for display to a user;
        collecting user feedback data related to the cited subset of the one or more of the plurality of chat messages;
        labeling the cited subset of the one or more of the plurality of chat messages using the user feedback data;
        generating a training dataset using the labeled subset of the one or more of the plurality of chat messages;
        using the training dataset to train the ML model to identify the chat messages related to the meeting; and
        iterating a process of generating the training dataset and training the ML model with larger sets of chat messages until the trained ML model meets a threshold of accuracy.

2. The data processing system of claim 1, wherein the trained ML model is used to identify the chat messages associated with the meeting.

3. The data processing system of claim 2, wherein the generative AI tool is used to summarize the identified chat messages for the user attending the meeting.

4. The data processing system of claim 1, wherein the plurality of chat messages are messages that are directly linked to the meeting.

5. The data processing system of claim 1, wherein the user feedback data includes positive feedback for the cited subset of the plurality of the chat messages.

6. The data processing system of claim 5, wherein the cited subset of the plurality of chat messages that receive the positive feedback are labeled with a positive label.

7. The data processing system of claim 5, wherein the positive feedback is received via a thumbs up user interface element.

8. The data processing system of claim 1, wherein the user feedback data includes positive feedback for the cited subset of the plurality of the chat messages.

9. The data processing system of claim 8, wherein the positive feedback is received via a thumbs up user interface element.

10. The data processing system of claim 1, wherein the plurality of chat messages include at least one of the chat messages that are directly linked to the meeting, top search result chat messages, the chat messages between two or more meeting participants, the chat messages between one or more meeting participants and other users, and all of the chat messages exchanged within a given time period.

11. The data processing system of claim 1, wherein the plurality of chat messages are pre-processed before being included in the prompt.

12. A method for training a machine-learning (ML) model to identify chat messages that are relevant to a meeting, the method comprising:
receiving a set of chat messages between one or more users;
receiving additional data related to the meeting;
constructing a prompt, via a prompt construction engine, for transmission to a generative artificial intelligence (AI) tool, the prompt including one or more chat messages in the set of chat messages and at least some of the additional data;
transmitting the prompt to the generative AI tool;
receiving from the generative AI tool a summary of the one or more chat messages in the set of chat messages, the summary identifying a subset of the one or more chat messages in the set of chat messages;
providing the identified subset of the one or more chat messages for display to a user;
collecting user feedback data related to the identified subset of the one or more chat messages;
labeling at least some of the identified subset of the one or more chat messages using the user feedback data;
generating a training dataset using the labeled at least some of the identified subset of the one or more chat messages;
using the training dataset to train the ML model to identify the chat messages relevant to the meeting; and
iterating a process of generating the training dataset and training the ML model with larger sets of chat messages until the trained ML model meets a threshold of accuracy.

13. The method of claim 12, wherein the trained ML model is used to identify the chat messages relevant to the meeting.

14. The method of claim 13, wherein the generative AI tool is used to summarize the identified chat messages for the user attending the meeting.

15. The method of claim 12, wherein the set of chat messages include at least one of chat messages that are directly linked to the meeting, top search result chat messages, chat messages between two or more meeting participants, the chat messages between one or more meeting participants and other users, and all chat messages exchanged within a given time period.

16. The method of claim 12, wherein when the set of chat messages includes a large number of chat messages a mechanism is used to reduce the number of chat messages before the set of chat messages is included in the prompt.

17. A non-transitory computer readable medium on which are stored instructions that, when executed, cause a programmable device to perform functions of:
receiving a request to assist a user to prepare for a meeting;
retrieving a plurality of chat messages;
retrieving additional data related to the meeting;
providing the plurality of chat messages and the additional data to a trained message identifying machine-learning (ML) model, the trained message identifying ML model being a model that is trained to identify chat messages that are relevant to a given meeting;
receiving a subset of the plurality of chat messages as an output from the trained message identifying ML model;
constructing a prompt, via a prompt construction engine, for transmission to a generative artificial intelligence (AI) tool, the prompt including one or more of the subset of the plurality of chat messages and at least some of the additional data;
transmitting the prompt to the generative AI tool;
receiving from the generative AI tool a summary of the one or more of the plurality of chat messages, the summary citing one or more of the subset of the plurality of chat messages; and
providing the summary and the cited one or more of the subset of the plurality of chat messages for display to the user.

18. The non-transitory computer readable medium of claim 17, wherein the plurality of chat messages include at least one of the chat messages that are directly linked to the meeting, top search result chat messages, the chat messages between two or more meeting participants, the chat messages between one or more meeting participants and other users, and all of the chat messages exchanged within a given time period.

19. The non-transitory computer readable medium of claim 17, wherein when the plurality of chat messages includes a large number of the chat messages a mechanism is used to reduce the number of the chat messages before the plurality of chat messages is included in the prompt.

20. The non-transitory computer readable medium of claim 17, wherein the plurality of chat messages are pre-processed before being provided to the trained message identifying ML model, the pre-processing including at least one of grouping the plurality of chat messages based on thread, removing irrelevant chat messages, and identifying the chat messages that are related to each other.

\* \* \* \* \*